Dec. 16, 1941.   W. BLAIR   2,266,302
POWER DRIVEN PORTABLE TOOL
Filed May 8, 1939   2 Sheets-Sheet 1
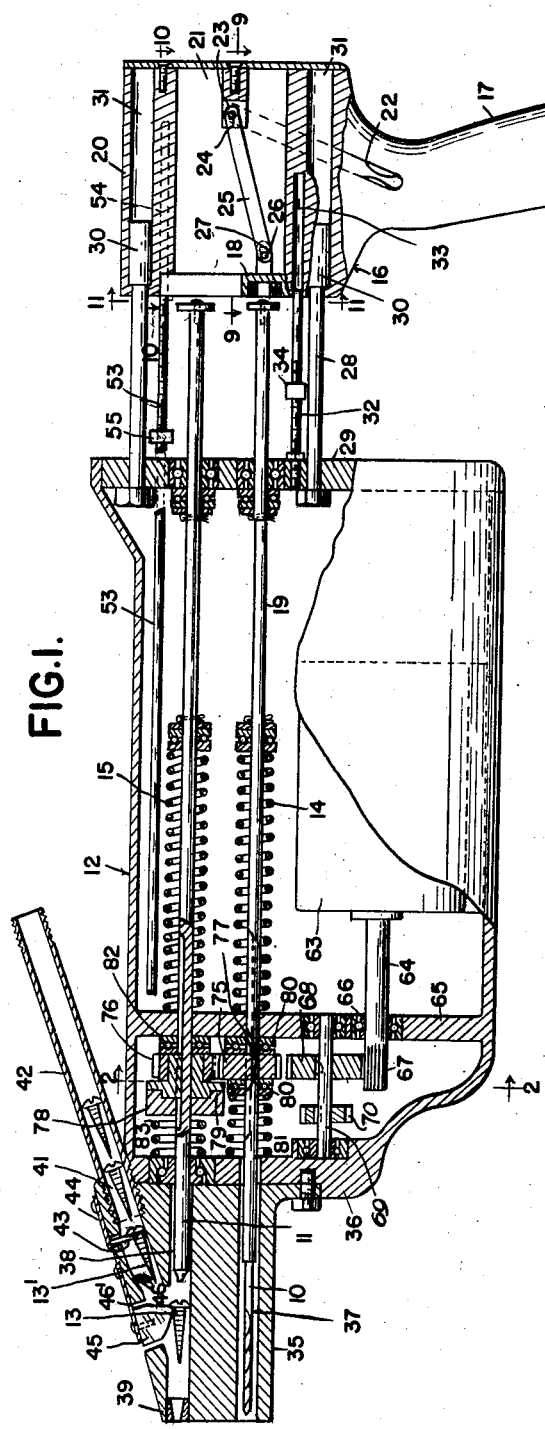
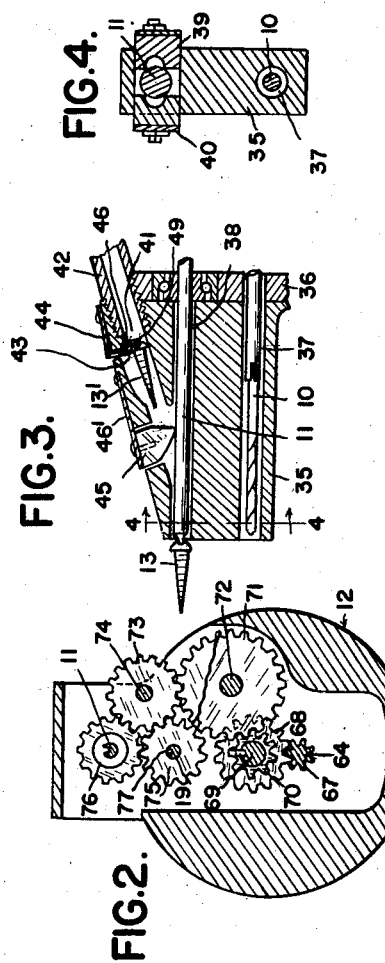
INVENTOR.
WALTER BLAIR
BY
ATTORNEYS Dec. 16, 1941.  W. BLAIR  2,266,302
POWER DRIVEN PORTABLE TOOL
Filed May 8, 1939   2 Sheets-Sheet 2
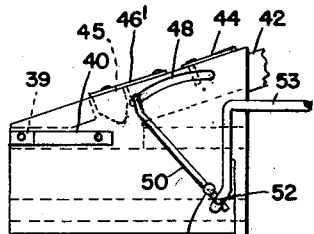
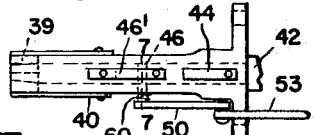
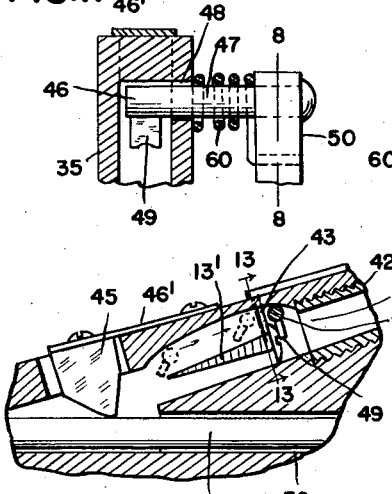
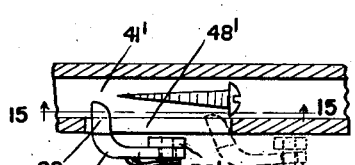
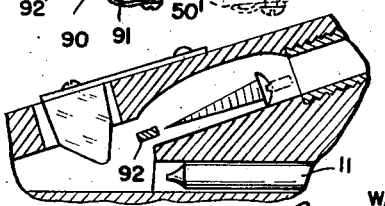
INVENTOR.
WALTER BLAIR
BY
ATTORNEYS Patented Dec. 16, 1941

2,266,302

UNITED STATES PATENT OFFICE 2,266,302

POWER DRIVEN PORTABLE TOOL

Walter Blair, Detroit, Mich.

Application May 8, 1939, Serial No. 272,537

11 Claims. (Cl. 144—32)

This invention relates generally to tools and refers more particularly to an improved portable power driven tool embodying a pair of selectively operable implements, such as a screw driver and a drill.

One of the principal objects of this invention consists in the provision of a tool of the above type composed of a relatively few simple parts capable of being inexpensively manufactured and readily assembled.

Another object of the present invention resides in the provision of a portable, relatively light, compact tool device capable of being easily handled and readily manipulated to alternately effect operation of the drill and screw driver instrumentalities.

A further object of this invention consists in the provision of a tool device of the character previously set forth wherein both the drill and screw driver elements are normally in a retracted position within the body of the device and are capable of being alternately projected beyond the forward end of the device to their operative positions by a relatively simple manipulation of the device.

A still further feature of this invention resides in the novel means provided herein for successively feeding the screws to be attached in alignment with the screw driver at the forward end of the latter for engagement therewith upon movement of the same to its projected or operative position aforesaid.

In addition to the foregoing, the present invention contemplates an ejector operable in timed relation to movement of the screw driver implement to its retracted position to positively eject a screw from the supply to a position in advance of the screw driver in the path of travel of the latter so as to be engaged by the free end of the screw driver when the latter is again projected to its operative position.

The foregoing, as well as other objects, will be made more apparent as this description proceeds, especially when considered in connection with the accompanying drawings, wherein:

Figure 1 is a side elevational view, partly in section, of a tool device embodying the various features of the present invention;

Figure 2 is a cross sectional view taken substantially on the plane indicated by the line 2—2 of Figure 1;

Figure 3 is a sectional view of the forward end of the device illustrating the position of the ejector mechanism when the screw driver is in its operative or projected position;

Figure 4 is a cross sectional view taken substantially on the plane indicated by the line 4—4 of Figure 3;

Figure 5 is a plan view of the fixture at the front end of the device showing the ejector mechanism;

Figure 6 is a side elevational view of the construction shown in Figure 5;

Figure 7 is a cross sectional view taken substantially on the plane indicated by the line 7—7 of Figure 5;

Figure 8 is a sectional view taken substantially on the plane indicated by the line 8—8 of Figure 7;

Figure 9 is a sectional view taken substantially on the plane indicated by the line 9—9 of Figure 1;

Figure 10 is a sectional view taken substantially on the plane indicated by the line 10—10 of Figure 1;

Figure 11 is a sectional view taken substantially on the line 11—11 of Figure 1;

Figure 12 is an enlarged sectional view showing one of the several positions of the ejector mechanism;

Figure 13 is a sectional view taken substantially on the line 13—13 of Figure 12;

Figure 14 is a sectional top plan view illustrating a slightly modified form of ejector operating mechanism; and Figure 15 is a sectional view taken substantially on the plane indicated by the line 15—15 of Figure 14.

The tool device forming the subject matter of this invention is shown in Figure 1 as comprising a drill 10 and a screw driver 11 rotatably supported in lateral spaced relationship in a casing 12 with their axes of rotation located in a common plane. In addition, both the drill 10 and screw driver 11 are mounted in the casing 12 for reciprocation and are alternately movable from their retracted positions shown in Figure 1 to their operative or projected positions. In the projected position of the drill 10, the latter extends beyond the front face of the casing 12 a sufficient distance to provide for drilling the work, and the screw driver assumes a position shown in Figure 3 wherein it engages the head of the screw 13 to effect the rotation of the screw required to anchor the same into the work.

The drill 10 and screw driver 11 are normally maintained in their retracted or inoperative positions shown in Figure 1 by suitable springs 14 and 15, respectively, and are selectively positively moved to their operative or projected positions by sliding the handle unit 16 of the device forwardly relative to the casing 12. In this connection, it is to be understood that the tool device is portable and the unit 16 is provided with a depending pistol grip handle 17 to facilitate manipulation of the device.

In order to selectively move the drill 10 and screw driver implement 11 to their extended positions upon forward movement of the handle unit 16, an abutment 18 is mounted on the front face of the handle unit 16 for reciprocation in directions extending transversely to the path of travel of the handle unit. In Figure 1 of the drawings, the abutment 18 is shown in a position directly behind the rear end of a rod 19 having provision at the opposite end for attachment to the drill 10. As a result, forward movement of the handle unit 16 effects a corresponding movement of the drill 10 against the action of the spring 14. In this connection, it is to be noted that the portion of the handle unit 16, supporting the abutment unit 18, is in the form of a housing 20 having a central bore 21 adapted to receive the rear end of the screw driver implement 11 when the abutment 18 is in the position shown in Figure 1 to operate the drill 10. In the event it is desired to move the screw driver 11 to its extended position upon forward displacement of the handle unit 16, the abutment 18 is merely moved from the position shown in Figure 1 to a position directly behind the rear end of the screw driver 11 where it will engage the latter end and effect a forward displacement of the screw driver 11 against the action of the spring 15 when the handle unit is displaced in the forward direction. During this operation, the bore 21 in the housing 20 of the handle unit receives the rear end of the rod 19 so as not to interfere with the position of the drill 10.

The abutment 18 is selectively moved to the two positions aforesaid by means of a control 22 having the free end located in a convenient position adjacent the grip 17 for manipulation by the operator and having the other end secured to a rockshaft 23 shown in Figure 9 as supported in the housing 20 of the handle unit for rocking movement. It will also be observed from Figure 9 that the rockshaft is provided with a polygonally shaped portion 24 extending through a correspondingly shaped opening formed in the rear end of a link 25 having the opposite end pivotally connected to the rear face of the abutment 18 by means of the pin 26. The pin 26 is carried by the abutment and extends through an elongated slot 27 in the forward end of the link 25 to permit rectilinear movement of the abutment, irrespective of the arcuate path of travel of the forward end of the link 25.

It will be understood from the foregoing that the handle unit 16 is mounted for reciprocation relative to the casing 12 and the following construction is provided for accomplishing this result. Referring again to Figure 1, it will be noted that a pair of guide rods 28 is secured to the rear wall 29 of the casing 12 and projects rearwardly beyond the latter wall for connection with the handle unit 16. In the present instance, the rear ends of the rods 28 are provided with enlargements 30 slidably engaging within suitable bores 31 formed in the housing 20 of the handle unit. The enlargements 30 are of sufficient axial extent to provide an adequate support for the handle unit 16 and the lengths of the rods 28 are sufficient to permit the extent of sliding movement of the handle unit 16 required to properly operate the drill and screw driver.

It may be desirable in some cases to vary the stroke of the drill 10 to provide for drilling holes of different depths in the work and, for accomplishing this result, I provide means for limiting the extent of forward movement of the handle unit 16 when the abutment 18 is in the position shown in Figure 1 directly behind the drill operating rod 19. In detail, the means aforesaid comprises a threaded rod 32 having the forward end secured to the rear wall 29 of the casing 12 and having the rear end positioned in alignment with a bore 33 formed in the housing 20. The bore 33 provides sufficient clearance to receive the rear end portion of the threaded rod 32 when the handle unit 16 is moved forwardly relative to the casing 12. Adjustably mounted on the rod 32 intermediate the ends thereof is a stop collar 34 of greater diameter than that of the bore 33 and prevented from entering the latter by the abutment 18 when the latter is in the position thereof shown in Figure 1. As a result, the collar 34 forms a stop to limit the extent of forward movement of the handle unit 16 when the abutment 18 is in a position to operate the drill 10.

Referring again to Figure 1 of the drawings, it will be noted that a guide fixture 35 is secured to the front wall 36 of the casing 12 and is provided with laterally spaced bores 37 and 38, respectively, receiving the forward end portions of the drill 10 and screw driver implement 11. Referring now to Figures 4 to 6, inclusive, it will be noted that the opposite sides of the front end of the bore 38 are cut away to receive a pair of spring pressed jaws 39. The jaws 39 are secured to the free ends of suitable leaf springs 40 having the rear ends anchored on the fixture 35 in a manner to normally resist outward movement of the jaws 39. The arrangement is such that the jaws cooperate with each other to yieldably grip the opposite sides of the screw 13 during the interval the latter is secured in the supporting structure by the screw driver 11.

In the present instance, the screws 13 are successively fed to a position in the bore 38 in advance of the screw driver 11 when the latter is in its retracted position, and this result is accomplished in the following manner: The fixture 35 is shown in Figure 1 as having a downwardly inclined passage 41 communicating at the discharge end with the bore 38 in advance of the screw driver 11 when the latter is in its retracted position and communicating at the opposite end with a chute 42 forming a magazine for retaining the screws 13. The lowermost screw in the delivery end of the discharge chute is prevented from accidental displacement into the passage 38 by means of a spring influenced stop 43 projecting into the passage 41 for engagement with the underside of the head of the screw 13' and having the outer end secured to the free end of a leaf spring 44 which, in turn, is anchored at its opposite end to the fixture 35. As a result, the screw 13' is yieldably maintained in the position shown in Figure 1 where it cannot interfere with the operation of the screw driver 11. In addition, it is desirable to provide some means for holding a screw in the passage 38 preparatory to engaging the screw with the end of the screw driver 11. This is accomplished, in the present instance, by providing a second spring influenced stop 45 having the inner end projecting into the bore 38 adjacent the delivery end of the discharge chute and having the outer end secured to the free end of a leaf spring 46' which, in turn, is secured at the opposite end to the fixture 35. The free end of the stop 45 projects into the passage 38 a sufficient distance to engage the screw at the underside of the head portion of the latter to prevent accidental forward displacement of the screw prior to movement of the screw driver 11 to its extended position.

In accordance with the present invention, the screw 13' in the delivery end of the supply chute is positively ejected into the passage 38 in timed relation to movement of the screw driver 11 to its retracted position. For accomplishing this result, I provide an ejector 46 having a shank portion 47 extending through an elongated arcuate slot 48 in one side of the fixture and having a projection 49 extending into the passage 41 of the screw supply chute 42. The outer end of the shank 47 is rockably supported in the free end of a link 50 having a portion adjacent the opposite end pivotally connected to the fixture 35 by means of the pin 51. The extreme lower end of the link 50 has a slot and pin connection 52 with the forward end of a push rod 53 extending rearwardly through the casing 12 for actuation by the handle unit 16. In this connection, it will be noted that the handle unit is axially bored, as at 54, to receive the rear end of the push rod 53, and the latter is threaded to provide for adjustably mounting a stop collar 55 thereon. A second adjustable stop collar 56 is threaded on the end of the push rod 53 and is adapted to be slidably received in the bore 54 formed in the housing 20 of the handle unit. For the purpose of operating the push rod 53 by the handle unit 16, it will be noted from Figures 10 and 11 that the abutment 18 is formed with a hook portion 57 on one side adapted to receive a portion of the rear end of the push rod 53 located between the adjusting collars 55 and 56 when the abutment 18 is shifted from the position in Figure 1 to a position at the rear of the screw driver implement 11.

The above arrangement is such that, when the abutment 18 is moved to a position at the rear of the screw driver implement 11 and the handle unit 16 is moved forwardly relative to the casing 12 to project the screw driver 11 into engagement with the screw located in the passage 38, the collar 55 is engaged by the hook 57 to effect a forward displacement of the push rod 53. Movement of the push rod 53 forwardly swings the ejector 46 in a rearward direction through the arcuate slot 48 and permits the projection 49 on the ejector to pass over the screw 13' in the delivery end of the supply chute to a position at the rear of the head portion of this screw. In this connection, it may be pointed out that, when the projection 49 passes over the head portion of the screw 13', the shank 47 is rocked against the action of a spring 60 so that, when the projection assumes a position behind the head of the screw 13', the spring 60 will return the projection to its operative position wherein the same engages the top surface of the head of the screw 13'. When, on the other hand, the handle unit 16 is moved rearwardly and the screw driver 11 returned to its retracted position by the spring 15, the collar 56 engages the hook 57 and returns the ejector 46 to its initial position at the forward end of the slot 48. During this return movement of the ejector, the projection 49 overcomes the action of the spring influenced stops 43 and 45 to force the screw 13' to a position in the passage 38. It will, of course, be understood that the stop 56 is so adjusted that the screw 13' is ejected into the passage 38 after the screw driver 11 assumes its retracted position so that the screw 13' will assume a position in the passage 38 in advance of the screw driver 11. It will also be noted that, when the abutment 18 is in the position thereof shown in Figure 1 at the rear side of the drill 10, the rear end of the push rod 53 merely retreats into the bore 54 and has no effect whatsoever on the operation of the ejector 46.

Both the drill 10 and the screw driver 11 are, of course, rotated and, for accomplishing this result, I provide a prime mover in the form of an electric motor 63 suitably supported in the lower regions of the casing 12. The prime mover 63 is provided with a drive shaft 64 extending through a partition 65 in the casing and journalled in a bearing 66 supported in the partition 65. The free end of the drive shaft is operatively connected to both the drill 10 and screw driver 11 through the medium of reduction gearing shown in Figure 2 of the drawings. In detail, the end of the drive shaft 64 is provided with gear teeth 67 adapted to mesh with a pinion 68 mounted on a countershaft 69 having a second pinion 70 meshing with a gear 71 secured to a second countershaft 72. The gear 71 meshes with a pinion 73 rotatably supported on a shaft 74 and, in turn, meshing with pinions 75 and 76, respectively, mounted on the drill operating rod 19 and screw driver 11. In the present instance, the pinion 75 is splined, as at 77, on the drill operating rod 19 for driving the latter and the pinion 76 is freely rotatably mounted on the screw driver 11. The pinion 76 is operatively connected to the screw driver 11 through the medium of a clutch member 78 splined on the screw driver and having clutch teeth 79 on the rear side adapted to mesh with corresponding teeth on the front face of the pinion 76. The arrangement is such that, when the load on the screw driver exceeds the normal load required to fasten the screw in the work, the clutch 78 will permit rotation of the pinion 76 by the reduction gearing relative to the screw driver 11.

Upon reference to Figure 1, it will be noted that thrust bearings 80 are disposed upon opposite sides of the pinion 75 and the unit is held from sliding movement with the rod 19 by means of a spring 81 mounted in the manner clearly shown in Figure 1. A thrust bearing 82 is provided between the pinion 76 and the adjacent surface of the partition 65 of the casing 12 and the pinion 76 is yieldably held against this thrust bearing by means of a spring 83 similar to the spring 81. The spring 83 also acts upon the clutch 78 and normally maintains the cooperating teeth 79 in intermeshing relationship.

*Operation*

Assuming that the parts of the tool are in their relative positions shown in Figure 1, it will be noted that forward movement of the handle unit 16 relative to the casing 12 causes the abutment 18 to engage the rear end of the rod 19 and to move the drill 10 forwardly beyond the fixture 35 against the action of the spring 14. The extent to which the drill 10 is moved beyond the front face of the fixture 35 depends upon the particular adjustment of the stop collar 34 and is predetermined in accordance with the depth of hole it is desired to drill in the work. When the drilling operation has been completed, the handle unit 16 is moved rearwardly and the drill 10 is retracted to its inoperative position by means of the spring 14.

Assuming now that it is desired to thread a screw into the hole previously drilled, it will be noted that the operator merely manipulates the control 22 to move the abutment 18 to a position in rear of the screw driver 11. From the foregoing, it will be remembered that movement of the abutment 18 to this latter position causes the hook 57 to straddle the rear end portion of the push rod 53 between the adjustable collars 55 and 56. It follows, therefore, that forward movement of the handle assembly 16 engages the abutment 18 with the rear end of the screw driver and effects a corresponding movement of the screw driver against the action of the spring 15. As the screw driver 11 moves forwardly, it engages the head of the screw previously positioned in the passage 38 and forces the same between the spring urged jaws 39 into the work. During forward movement of the screw driver by the handle unit 16, the hook 57 on the abutment engages the adjustable collar 55 and swings the ejector 46 rearwardly of the slot 48 to a position wherein the projection 49 on the ejector moves past the lowermost screw in the delivery end of the supply chute 42.

When the screw has been completely engaged with the work, the operator returns the handle unit 16 to its rearwardmost position and the screw driver 11 is retracted to its inoperative position by the spring 15. During the final portion of rearward movement of the handle unit 16, the hook 57 engages the adjustable collar 56 on the push rod 53 and positively operates the ejector 46, through the rod 53, to displace the lowermost screw from a position in the delivery end of the supply chute to a position in the passage 38 in advance of the screw driver for engagement with the latter when the same is again moved to its extended position.

In Figures 14 and 15, I have shown a slightly modified form of ejector. This ejector differs from the one previously described in that it merely comprises a hook 90 having an arm 91 pivotally connected to the link 50' for swinging movement in a vertical plane and having an arm 92 projecting into the passage 41' through an arcuate slot 48'. The arrangement is such that when the link 50' is moved rearwardly, the arm 90 engages the head of the screw and is cammed upwardly over the head of the screw to a position in rear of the latter. As a result, when the link 50' is again moved forwardly, the arm 90 again abuts the head of the screw and ejects the same.

What I claim as my invention is:

1. In a portable tool device, a revoluble implement supported for reciprocation in a direction parallel to the axis of rotation thereof between retracted and extended positions, a second revoluble implement supported in lateral spaced relation to the first implement for sliding movement along the axis of reciprocation thereof between retracted and extended positions, yieldable means normally urging said implements to their retracted positions, a unit supported for shifting movement in opposite directions parallel to the axes of rotation of said implements and movable in one direction to effect movement of the latter against the action of the yieldable means to their extended positions, and means under the control of the operator and carried by said unit for alternately engaging said implements to effect selective operation of the latter by said unit.

2. In a tool device, a revoluble drill element supported for reciprocation in a direction parallel to the axis of rotation thereof between a retracted position and an extended position, a revoluble screw driver element supported to one side of the drill for reciprocation in a direction parallel to the axis of rotation thereof between retracted and extended positions, yieldable means normally urging said elements to their retracted positions, a unit supported for shifting movement relative to the elements in opposite directions parallel to the axes of rotation of said elements and movable in a direction toward the latter to effect movement of the elements to their extended positions against the action of the yieldable means, and a member carried by the unit for sliding movement transversely to the path of travel of the unit and alternately engageable with said elements to selectively advance the latter to their extended positions upon shifting the unit toward the elements.

3. In a portable tool device, an implement supported for reciprocation along a given axis between retracted and extended positions, a second implement supported in lateral spaced relation to said first implement for sliding movement along another given axis between retracted and extended positions, a support movable in parallelism with said axes and having an elongated opening aligned with said implements, and an actuator carried by said support in said opening and movable along the latter into alternate engagement with said implements for selectively advancing the latter to their extended positions upon said movement of said support.

4. In a portable tool device, an implement supported for reciprocation along a given axis between retracted and extended positions, a second implement supported in lateral spaced relation to said first implement for sliding movement along another given axis between retracted and extended positions, a support movable in parallelism with said axes and having an elongated opening aligned with said implements, and a single actuator carried by said support in said opening and movable along the latter alternately into operative engagement with said implements for advancing the latter individually and selectively to their respective extended positions upon said movement of said support.

5. In a portable tool device, an implement supported for reciprocation along a given axis between retracted and extended positions, a second implement supported in lateral spaced relation to said first implement for sliding movement along another given axis between retracted and extended positions, yieldable means for normally urging said implements toward their respective retracted positions, a support movable in parallelism with said axes and having an elongated opening aligned with said implements, and a single actuator carried by said support in said opening and movable along the latter alternately into operative engagement with said implements for advancing the latter in opposition to said means individually and selectively to their respective extended positions upon said movement of said support.

6. In a portable tool device, an implement supported for reciprocation along a given axis between retracted and extended positions, a second implement supported in lateral spaced relation to said first implement for sliding movement along another given axis between retracted and extended positions, a support movable in parallelism with said axes and having an elongated opening aligned with said implements, means for rotating at least one of said implements about its respective axis, an actuator carried by said support in said opening and movable along the latter into alternate engagement with said implements for selectively advancing the latter to their extended positions upon said movement of said actuator, and means operatively interconnecting said first means and said rotatable implement for ineffectuating said first means when the load on said last mentioned implement exceeds the normal load therefor.

7. In a portable tool device, a housing providing a pair of relatively inclined, intercommunicated chambers and having an outlet common to both thereof, a rotatable tool carried within one of said chambers, means for moving said tool toward and away from said outlet, said other chamber providing a supply of fastener elements arranged in end-to-end relationship therewithin for individual subjection to said tool and subsequent rotation and discharge thereby through said outlet, a pair of detents resiliently carried one within one of said chambers and the other in common relationship to both of said chambers, said first detent being normally engageable with one of the elements in said second chamber for holding said one element against advancement from said first detent past said second detent into said first chamber, said second detent normally residing in the path of said one element and being normally engageable with the element ahead of said one element in said first chamber for holding said forward element against advancement past said second detent through said outlet, a protractor for said one element, and means operatively interconnecting said protractor and said first means and responsive to that movement of the latter which effectuates movement of said tool toward said outlet for moving said protractor from one position to a position behind said first detent and responsive to that movement of said first means which effectuates movement of said tool away from said outlet for moving said protractor from said rearward position to its normal position and advancing said one element from said first detent into said first chamber in normal engagement with said second detent.

8. In a portable tool device, a pair of rotatable tools supported for rectilinear movement between positions of retraction and protraction, an actuator movable into alternate engagement with said tools to effect movement of the latter from said positions of retraction to said positions of protraction, means defining a chamber for housing fastener elements and having an outlet opening into the path of one of said tools between its positions of retraction and protraction, means cooperable with said chamber and movable into one position to constrain fastener discharge through said outlet and into another position to restrain said discharge, a second actuator connected to said second means and movable into one position to effect movement of said second means into one of said two positions therefor and into another position to effect movement of said second means into the other of said two positions therefor, and means carried by and movable with said first actuator and connectible to said second actuator for actuating the latter.

9. In a portable tool device, a pair of rotatable tools supported for rectilinear movement between positions of retraction and protraction, an actuator movable into alternate engagement with said tools to effect movement of the latter from said positions of retraction to said positions of protraction, means defining a chamber for housing fastener elements and having an outlet opening into the path of one of said tools between its positions of retraction and protraction, means cooperable with said chamber and movable into one position to constrain fastener discharge through said outlet and into another position to restrain said discharge, a second actuator connected to said second means and movable into one position to effect movement of said second means into one of said two positions therefor and into another position to effect movement of said second means into the other of said two positions therefor, a pair of members arranged on said second actuator in spaced relation to each other, and a third member arranged on said first actuator for movement therewith and engageable with one of said pair of members upon protraction effectuating movement of said first actuator for effectuating movement of said second actuator into one of said two positions therefor and with the other of said pair of members upon retraction effectuating movement of said first actuator for effectuating movement of said second actuator into the other of said two positions therefor.

10. In a portable tool device, a pair of rotatable tools supported for rectilinear movement between positions of retraction and protraction and disposed normally in said positions of retraction, an actuator movable into one position in engagement with one of said tools to effect movement of said one tool from its position of retraction into its position of protraction and into another position in engagement with the other of said tools to effect movement of said other tool from its position of retraction into its position of protraction, means defining a chamber for housing fastener elements and having an outlet opening into the path of one of said tools between its positions of retraction and protraction, means cooperable with said chamber and movable into one position to constrain fastener discharge through said outlet and into another position to restrain said discharge, a second actuator connected to said second means and movable into one position to effect movement of said second means into one of said two positions therefor and into another position to effect movement of said second means into the other of said two positions therefor, and a third actuator carried by said first actuator for movement therewith and operable upon arrangement of the latter in one only of said two positions therefor for actuating said second actuator.

11. In a portable tool device, a pair of rotatable tools supported for rectilinear movement between positions of retraction and protraction and disposed normally in said positions of retraction, an actuator movable into one position in engagement with one of said tools to effect movement of said one tool from its position of retraction into its position of protraction and into another position in engagement with the other of said tools to effect movement of said other tool from its position of retraction into its position of protraction, means defining a chamber for housing fastener elements and having an outlet opening into the path of one of said tools between its positions of retraction and protraction, means cooperable with said chamber and movable into one position to constrain fastener discharge through said outlet and into another position to restrain said discharge, a second actuator connected to said second means and movable into one position to effect movement of said second means into one of said two positions therefor and into another position to effect movement of said second means into the other of said two positions therefor, a pair of members arranged on said second actuator in spaced relation to each other, and a third actuator carried by said first actuator for movement therewith and engageable with one of said members during residence of said first actuator in one only of said two positions therefor and upon protraction effectuating movement of said first actuator for effectuating movement of said second actuator into one of said two positions therefor and with the other of said members during said residence and upon retraction effectuating movement of said first actuator for effectuating movement of said second actuator into the other of said two positions therefor.

WALTER BLAIR.